(12) United States Patent
Koshobu (10) Patent No.: US 8,710,787 B2
(45) Date of Patent: Apr. 29, 2014

(54) SERVOMOTOR CONTROL CIRCUIT

(75) Inventor: Nobuaki Koshobu, Kariya (JP)

(73) Assignee: Denso Corporation, Kariya (JP)

( * ) Notice: Subject to any disclaimer, the term of this patent is extended or adjusted under 35 U.S.C. 154(b) by 1022 days.

(21) Appl. No.: 12/800,284

(22) Filed: May 12, 2010

(65) Prior Publication Data

US 2010/0291853 A1    Nov. 18, 2010

(30) Foreign Application Priority Data

May 15, 2009  (JP) ................................ 2009-118706

(51) Int. Cl.
*G05B 11/01*    (2006.01)

(52) U.S. Cl.
USPC ........... 318/560; 318/626; 318/599; 318/466; 318/672; 318/601

(58) Field of Classification Search
USPC .................. 318/626, 560, 599, 466, 601, 672
See application file for complete search history.

(56) References Cited

U.S. PATENT DOCUMENTS

| | | | |
|---|---|---|---|
| 5,168,415 A | 12/1992 | Osuga | |
| 6,501,239 B2 * | 12/2002 | Ito et al. ........................ | 318/34 |
| 7,038,422 B2 * | 5/2006 | Nakajima .................... | 318/652 |
| 2004/0124797 A1 * | 7/2004 | Takeuchi et al. ............. | 318/466 |
| 2004/0232872 A1 * | 11/2004 | Sunaga et al. ................ | 318/652 |
| 2005/0012480 A1 * | 1/2005 | Takeuchi et al. ............. | 318/265 |
| 2005/0077858 A1 * | 4/2005 | Kuribayashi et al. ......... | 318/625 |

FOREIGN PATENT DOCUMENTS

| | | |
|---|---|---|
| JP | 2-146992 | 6/1990 |
| JP | 3-118719 | 5/1991 |
| JP | 7-117456 | 5/1995 |
| JP | 09-201084 | 7/1997 |
| JP | 2004-350428 | 12/2004 |
| JP | 2006-298170 | 11/2006 |
| JP | 2007-49835 | 2/2007 |
| JP | 2007049835 A * | 2/2007 |
| JP | 2007-314119 | 12/2007 |

OTHER PUBLICATIONS

Office action dated Apr. 20, 2011 in corresponding Japanese Application No. 2009-118706.

* cited by examiner

*Primary Examiner* — Eduardo Colon Santana
*Assistant Examiner* — Bickey Dhakal
(74) *Attorney, Agent, or Firm* — Harness, Dickey & Pierce, PLC (57) ABSTRACT

A servomotor control circuit for an air conditioner apparatus of a vehicle includes a drive control section for controlling drive of a servomotor so that the servomotor attains a target stop position, a rotation position change detection section for detecting a change in the rotation position of the servomotor, and an operation limit check section for checking, based on the change in the rotation position of the servomotor, whether the servomotor has attained the operation limit position. The drive control section stops drive of the servomotor without reception of a servomotor drive stop command produced from a main control apparatus, when the servomotor is determined as having attained the operation limit position.

5 Claims, 7 Drawing Sheets

SERVOMOTOR CONTROL CIRCUIT

CROSS REFERENCE TO RELATED APPLICATION

This application is based on and incorporates herein by reference Japanese Patent Application No. 2009-118706 filed on May 15, 2009.

FIELD OF THE INVENTION

The present invention relates to a servomotor control circuit, which receives from a main control apparatus a drive command including a target stop position of a servomotor and controls the servomotor based on the drive command.

BACKGROUND OF THE INVENTION

A conventional air conditioner apparatus for a vehicle (patent documents 1 to 3) is equipped with actuators (servomotors or the like), electronic control circuits and an electronic control unit (ECU). The actuators drive various doors such as an air mixing door provided in an air conditioner unit to rotate by output shafts thereof, respectively. The control circuits detect present positions of the output shafts of the actuators and control the actuators based on the detected present positions, respectively, thereby to drive each actuator to the target stop position. The ECU communicates with the control circuits and transmits the target stop position of each actuator to the corresponding control circuit.

If the actuator operates beyond a normal operation range in its operation without stopping for some reason, the air mixing door or a mode switching door hits a wall such as a duct of the air conditioner apparatus. The actuators, which use pulse encoders for detecting the present positions as disclosed in the patent documents 1 to 4, cannot detect the absolute values of the present positions. If the present position cannot be acquired after the turn-on of electric power or for some reasons, original position detection control is performed to fix the present position of the actuator. In this control, if the actuator is driven to rotate in reverse from the original position, the air mixing door or the mode switching door will hit the wall. If the air mixing door or the mode switching door hits the wall frequently or the actuator is continued to be driven while hitting the outside door, the wall of the air conditioner unit will be deformed or an unnecessary current will flow in the actuator. The electronic control unit therefore performs control to stop the actuator by detecting hitting of the wall.

Patent document 1: JP 2007-314119A
Patent document 2: JP 2005-112293A (US 2005/0077858)
Patent document 3: JP 2006-298170A
Patent document 4: JP 9-201084A According to the conventional apparatus, it takes some time for the electronic control unit to transmit a control command for stopping the servomotor to the servomotor control circuit after the present position of the servomotor become unavailable for some reason or the abnormality of the servomotor is detected by the electronic control unit based on the operation of the servomotor outside an operation range limit. It is also difficult to determine the abnormality instantaneously because the electronic control unit and the motor control circuit perform communications regularly. This problem becomes more remarkable if the number of the servomotors (the number of the servomotor control circuits) increases, because a communications interval and processing time necessarily become long.

It is also of disadvantage that no device is provided, which stops the servomotor, if the electronic control unit cannot control the servomotor because of abnormality arising in communications lines or communications circuits.

SUMMARY OF THE INVENTION

It is therefore an object of the present invention to provide a servomotor control circuit, which receives from a main control apparatus a drive command including a target stop position of a servomotor and controls the servomotor based on the drive command, and more particularly to provide a servomotor control circuit, which can speedily determine abnormality in an operation of the servomotor and stops the servomotor even if a servomotor stop command is not produced from the main control apparatus.

According to the present invention, a servomotor control circuit is provided for a system, which includes a servomotor for driving a control object, a main control apparatus for producing a servomotor drive command including a target stop position of the servomotor and a rotation position detection section provided at an output shaft of the servomotor for detecting a rotation position of the servomotor. The servomotor control circuit comprises a receiver section, a drive control section, a rotation position change detection section and an operation limit check section. The receiver section receives the servomotor drive command from the main control apparatus. The drive control section controls drive of the servomotor so that the rotation position of the servomotor attains the target stop position. The rotation position change detection section detects a change in the rotation position of the servomotor. The operation limit check section checks, based on the change in the rotation position of the servomotor, whether the servomotor has attained the operation limit position. The drive control section stops driving the servomotor without reception of a servomotor drive stop command produced from the main control apparatus, when the servomotor is determined as having attained the operation limit position.

The servomotor control circuit thus determines abnormality of the servomotor. As a result, even when the communications with the main control unit becomes impossible, the servomotor control circuit itself can detect abnormality and take fail-safe operation without waiting for commands from the main control unit. Further, the rotation position information need not be transmitted to the main control unit, and hence time required for determination of the operation limit position can be shortened.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
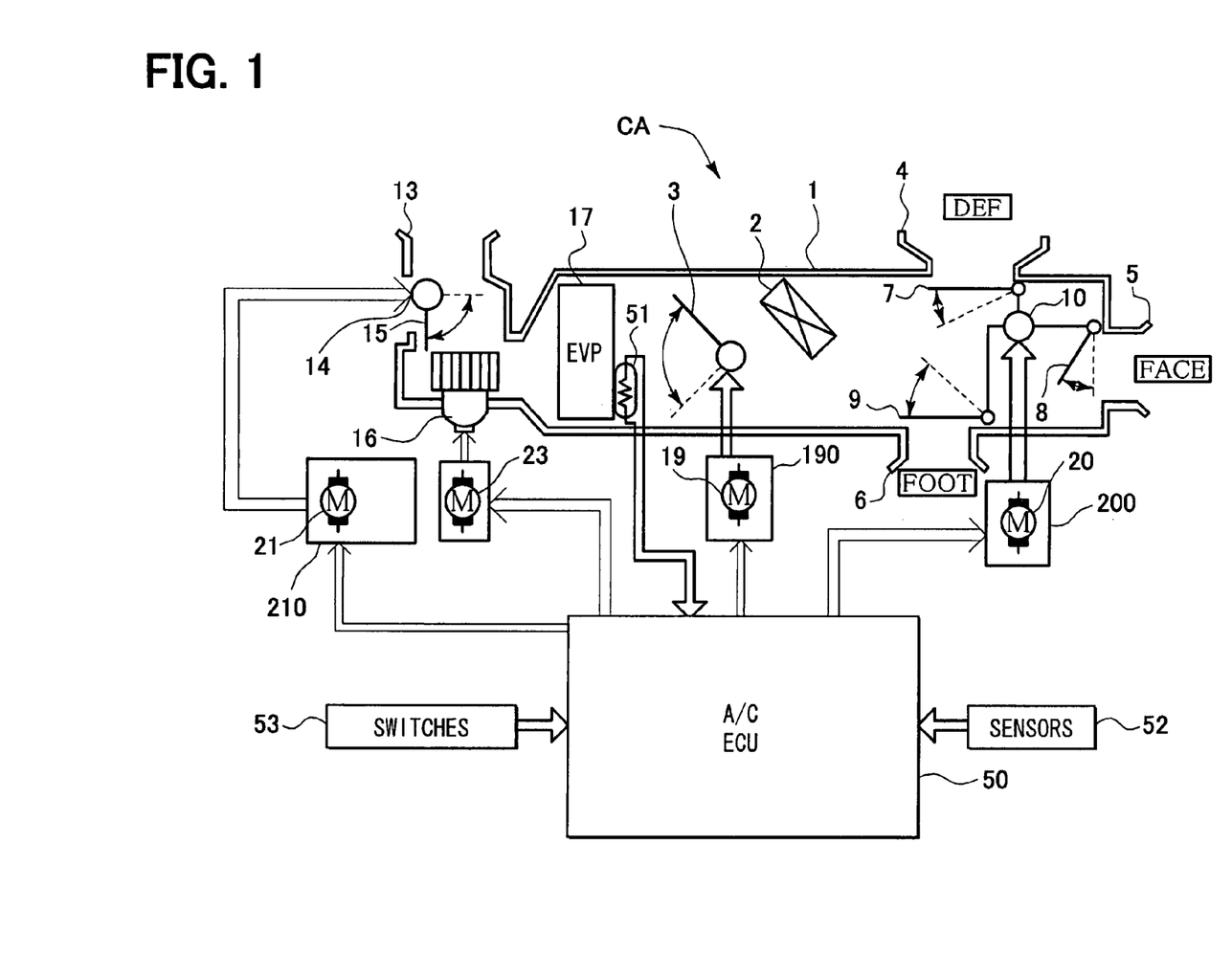
FIG. 1 is a schematic view showing an air conditioner apparatus for a vehicle.

A servomotor control circuit according to the present invention will be described with reference to the accompanying drawings showing one exemplary embodiment, in which the servomotor control circuit is used in an air conditioner apparatus CA for a vehicle as shown in FIG. 1.

The air conditioner apparatus CA has a duct (air flow passage) 1, which has an inside air inlet opening 13 for circulating vehicle inside air and an outside air inlet opening 14 for taking in vehicle outside air. These openings 13 and 14 are used selectively by being switched over by an inside/outside air switching damper 15. The air introduced into the inside air inlet opening 13 and the outside inlet air opening 14 are suctioned into the duct 1 by a blower 16 driven by a blower motor 23.

Inside the duct 1, an evaporator 17 and a heater core 2, which is operable to generate heat by waste heat of engine coolant water, are provided. The evaporator 17 cools the suctioned air and generates cooled air. The heater core 2 heats the cooled air and generates heated air. The cooled air and the heated air are mixed in proportion to an angular position of an air mixing damper 3 and blown off from outlet openings 4, 5 and 6.

The outlet opening 4 is a defroster blow-off opening (DEF) for defrosting a front windshield and opens at the upper side of an instrument panel toward the lower part of the front windshield. The outlet opening 5 is a face blow-off opening (FACE) and opens at the front center of the instrument panel. The outlet opening 6 is a foot blow-off opening (FOOT) and opens at the lower side of the instrument panel toward the floor of the compartment. These openings are opened and closed individually by respective blow-off opening switching dampers 7, 8 and 9. Specifically, according to a damper control rotation input phase from a blow-off opening switching motor 20, a damper drive gear mechanism 10 switchably opens only the defroster blow-off opening 4, only the foot blow-off opening 6, only the foot blow-off opening 5, both the face blow-off opening 5 and the defroster blow-off opening 4, or both the foot opening 5 and the defroster blow-off opening 4, for example.

The inside/outside air switching damper 15, which is a control object and a movable member, is electrically driven by an inside/outside switching servomotor 21. The air mixing damper, which is also a control object and a movable member, is electrically driven by an air mixing servomotor 19. The blow-off opening dampers 7, 8 and 9, which are also control objects and movable members, are electrically driven by a blow-off opening switching servomotor 20. These servomotors 19, 20 and 21 may be, for example, DC servomotors, the operations of which are controlled by servomotor control circuits (SCC) 190, 200 and 210, respectively. The blower motor 23 may be a brushless motor or the like, the rotation speed of which is controlled by pulse width modulation (PWM) control of an air conditioner (A/C) A/C ECU 50, so that the amount of the blow-off air is adjusted.

The A/C ECU 50, which is a main control apparatus, is a computer hardware including a CPU, a ROM, a RAM and the like. A group of sensors 52 and a group of switches 53 are connected to the A/C ECU 50. The sensors 52 include an evaporator sensor 51, an inside air temperature sensor, and an outside air temperature sensor, a coolant water temperature sensor, a solar radiation sensor and the like. The switches 53 include a temperature setting switch, a blow-off amount setting switch, a blow-off opening changeover switch, an inside/outside air changeover switch and the like.

The A/C ECU 50 is configured to perform, for example, the following controls by execution of an air conditioner control program stored in a built-in ROM (not shown). The A/C ECU 50 performs blow-off air temperature control by controlling the opening angle of the air mixing damper 3 based on the input information of the set temperature of the temperature setting switch in the switches 53 as well as the output information of the inside air temperature sensor, the outside air temperature sensor, the coolant water temperature sensor and the solar radiation sensor, so that the vehicle inside temperature approaches the set temperature. The A/C ECU 50 controls blow-off amount control of the blower motor 23. The A/C ECU 50 outputs servomotor drive commands to servomotor control circuits 190 and 200. The servomotor control circuit 190 controls the air mixing servomotor 19 so that the position of the air mixing damper 3 is changed. The servomotor control circuit 200 controls the switching servomotor 20 so that the positions of the switching dampers 7, 8 and 9 are changed, respectively.

The A/C ECU 50 further outputs a servomotor drive command to a servomotor control circuit 210, which controls the inside/outside air switching servomotor 21 so that the switching damper 15 is switched to the inside air position, the outside air position or an intermediate position between the inside air position and the outside air position in correspondence to the input operation condition of the inside/outside air changeover switch included in the switches 53.

Figure 2:
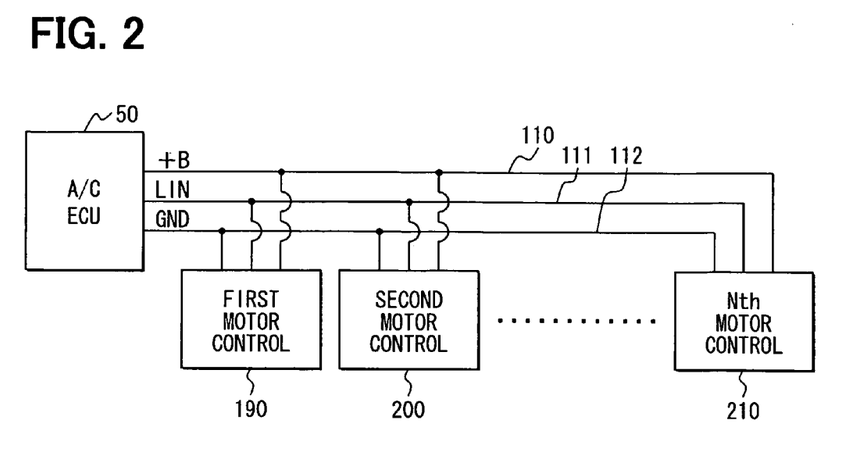
FIG. 2 is a block diagram showing connections between an A/C ECU and servomotor control circuits.
Figure 3:
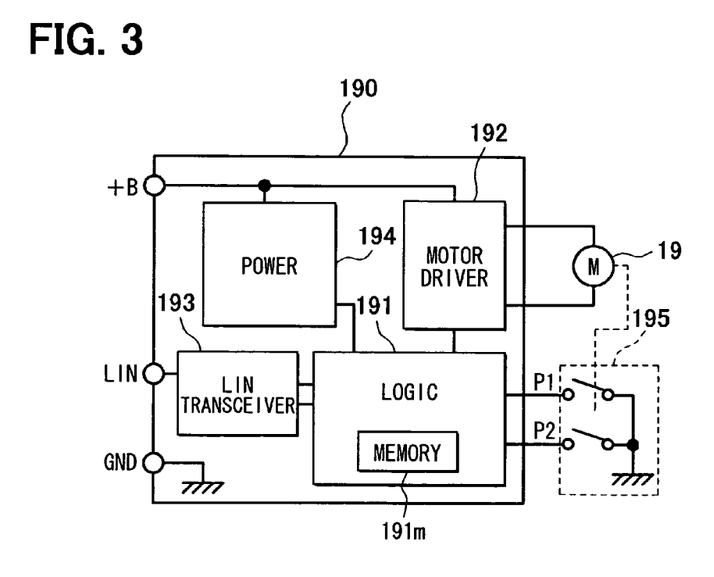
FIG. 3 is a circuit diagram showing the servomotor control circuit.

The A/C ECU 50 and the first to Nth servomotor control circuits are connected as shown in FIG. 2. The first to Nth servomotor control circuits are provided separately from the A/C ECU 50. The A/C ECU 50 and each of the servomotor control circuits 190, 200, 210 are connected via a local interconnect network (LIN) line 111 to be capable of two-way communications. LIN is one of in-vehicle local area network (LAN) communications protocols. A power line (+B) 110 and a ground line (GND) 112 are common between the A/C ECU 50 and the servomotor control circuits. The first, second and Nth servomotor control circuits correspond to the servomotor control circuits 190, 200 and 210 shown in FIG. 1, respectively. The servomotor control circuit 190 is configured as shown in FIG. 3 in a block diagram. The other servomotor control circuits 200, 210 also have the similar configuration as the servomotor control circuit 190. The servomotor control circuit 190 includes a logic circuit 191, a motor driver 192, a LIN transceiver 193 and an electric power source 194. The servomotor control circuit 190 may be integrated or physically coupled with the servomotor 19, while the A/C ECU 50 is provided away from the servomotor 50.

The power source 194 supplies electric power of a predetermined voltage level from the power line (+B) 110 to each part of the servomotor control circuit 190, the air mixing servomotor 19 and the like. The LIN transceiver 193 is a communications interface circuit connected to the LIN network line 111 for communications and operates as a receiver section and a transmitter section. The motor driver 192 includes a circuit for driving the servomotor 19.

Figure 4A:
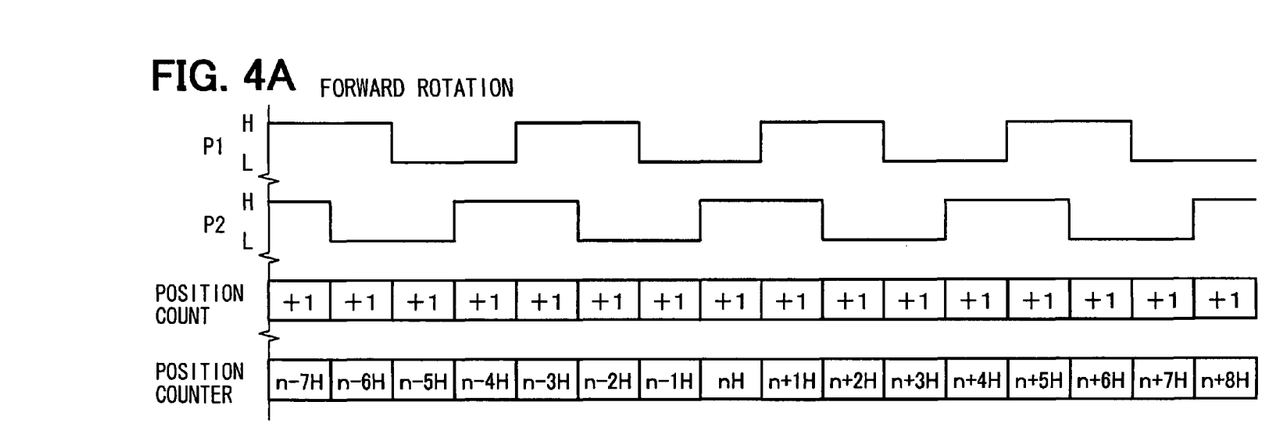
FIGS. 4A and 4B are time charts showing relations between pulse encoder input signals and rotation position counter operations.

A pulse encoder 195 is provided near the rotation shaft of the servomotor 19 and driven in synchronism with the rotation of the servomotor 19 to generate pulse signals. It may include a conventional rotary encoder and wave shaper circuit. The pulse encoder 195 generates from its wave shaper circuit (not shown) the pulse signals P1 and P2 as shown in FIGS. 4A and 4B. These pulse signals P1 and P2 are applied to the logic circuit 191. The pulse signals P1 and P2 are produced from the wave shaper circuit in two combination patters, which are different from each other in accordance with the direction of motor rotation. The pulse signals P1 and P2 are out of phase by 90° in different manner in accordance with the direction of motor rotation. In FIG. 4A, the pulse signal P2 is always at a high (H) level when the pulse signal P1 rises. This state is detected as a forward rotation. Each time the rising and falling edges of the pulse signals P1 and P2 are detected, the rotation position is counted up (+1) thereby incrementing a count value of a rotation position counter stored in the memory 191m.

Figure 4B:
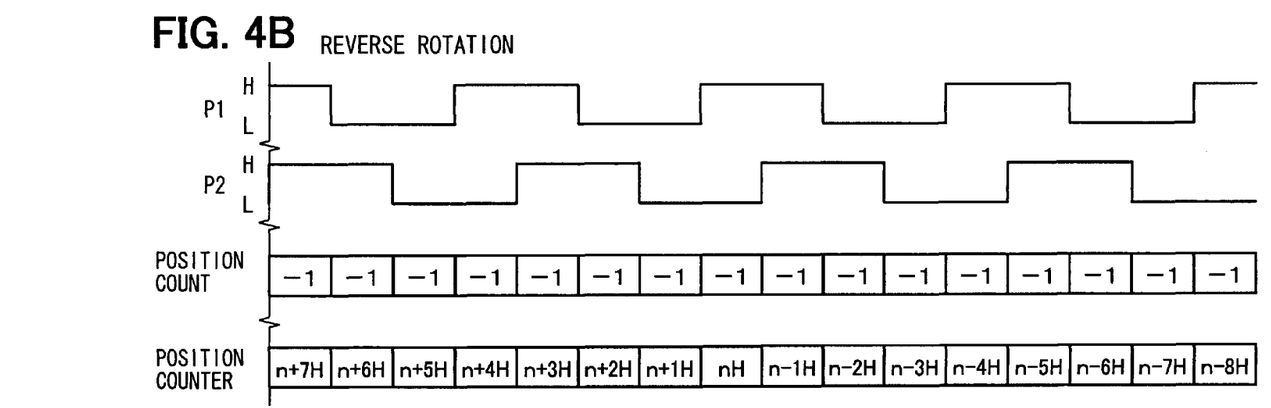

In FIG. 4B, the pulse signal P2 is always at a low (L) level when the pulse signal P1 rises. This state is detected as a reverse rotation. Each time the rising and falling edges of the pulse signals P1 and P2 are detected, the rotation position is counted down (−1) thereby decrementing the count value of the rotation position counter. Thus, both the rotation direction and the rotation position of the servomotor 19 are determined and detected. The pulse encoder 195 thus operates as a rotation position detection section. The number of pulse encoders may be one or two.

Referring back to FIG. 3, the logic circuit 191 including the memory 191m may be configured as a conventional microcomputer including a CPU, a ROM, a RAM and the like or as a hardwired logic circuit. The logic circuit 191 is configured to operate as a drive control section, a rotation position change detection section, an operation limit check section, a sampling section and a position comparison section. The memory 191m operates as a rotation position change detection section and a coincidence count storing section.

Figure 5:
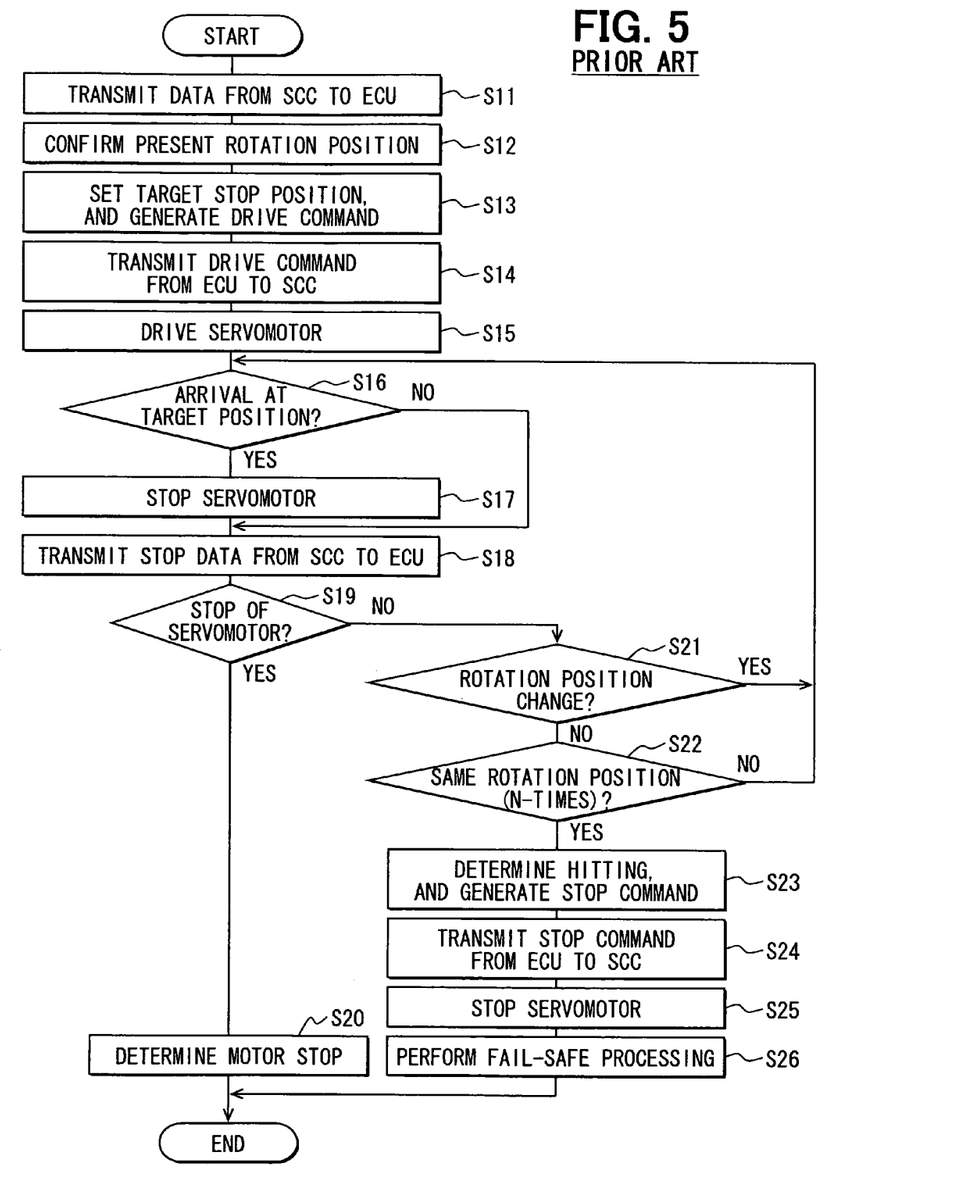
FIG. 5 is a flowchart showing servomotor drive control processing performed in a conventional air conditioner apparatus.

In the conventional apparatus, the servomotor drive control processing is executed as shown in FIG. 5. The A/C ECU 50 and the servomotor control circuit (SCC) 190 perform data communications regularly through the LIN line 11. The other servomotor control circuits also perform data communications similarly. In this data communications, the servomotor control circuit 190 transmits state data indicating the state of the servomotor 1 to the A/C ECU 50. The state data includes a present rotation position of the servomotor 19, that is, count value of the rotation position counter stored in the memory 191m (S11).

The A/C ECU 50 confirms the present rotation position of the servomotor 19 (S12). The A/C ECU 50 then sets a target stop position of the servomotor 19 based on various states detected by the sensors 52, user operations (setting) of the operation switches 53 and the present rotation position of the servomotor 19, and generates a servomotor drive command for driving the servomotor 19 to the target stop position (S13). The A/C ECU 50 transmits the servomotor drive command to the servomotor control circuit 190 (S14).

When the logic circuit 191 of the servomotor control circuit 190 receives the servomotor drive command from the A/C ECU 50 through the LIN transceiver 193, it transmits a drive command to the motor driver 192 to rotate the servomotor 19 in the forward or reverse direction so that the servomotor 19 stops at the target stop position (S15).

If the detected present rotation position of the servomotor 19 arrives at the target stop position, that is, the present position coincides with the target stop position (S16: YES), the logic circuit 191 transmits a stop command to the motor driver 192 for stopping the servomotor 19 (S17).

Then, in communicating with the A/C ECU 50 regularly, the servomotor control circuit 190 transmits to the A/C ECU 50 the present rotation position of the servomotor 19 detected based on the pulse signals P1 and P2 of the pulse encoder 19 while the servomotor 19 is in rotation. The servomotor control circuit 190 transmits to the A/C ECU 50 stop data indicating the stop of the servomotor 19 when the servomotor 19 has stopped at the target stop position (S18).

The A/C ECU 50 checks if the data received from the servomotor control circuit 190 includes the stop data therein. If the stop data is included (S19: YES), the A/C ECU 50 determines that the servomotor 19 has stopped at the target stop position (S20).

If the stop data indicating the stop of the servomotor 19 is not included (S19: NO), the A/C ECU 50 compares the present rotation position of the servomotor 19 received this time and the present rotation position of the servomotor 19 received in the previous communications to check whether the present rotation position has changed. If there is a change in the present rotation positions (S21: YES), the processing returns to S16 and waits for the next communications.

If there is no rotation position change (S21: NO), the A/C ECU 50 checks whether the present rotation position continues to remain the same. If the present rotation position does not remain the same for a predetermined number of times, for example N (5) times, (S22: NO), the processing returns to S16 and waits for the next communications.

When the present rotation position remains the same N-times (S22: YES), the A/C ECU 50 determines that the air mixing damper 3 is driven in excess of the operation limit and hitting or abutting the inside wall of the duct 1 and generates a motor stop command (S23). In the next regular communications, the A/C ECU 50 transmits the motor stop command to the servomotor control circuit 190 (S24).

The logic circuit 191 of the servomotor control circuit 190 immediately stops the servomotor 19 by transmitting the stop command to the motor driver 192 (S25). In the next regular communications, the servomotor control circuit 190 transmits to the A/C ECU 50 data indicating that it has stopped the servomotor 19. Then A/C ECU 50 performs fail-safe processing for, for example, returning the air mixing damper 3, that is, servomotor 19, to the normal position or to the initial position (S26).

Figure 6:
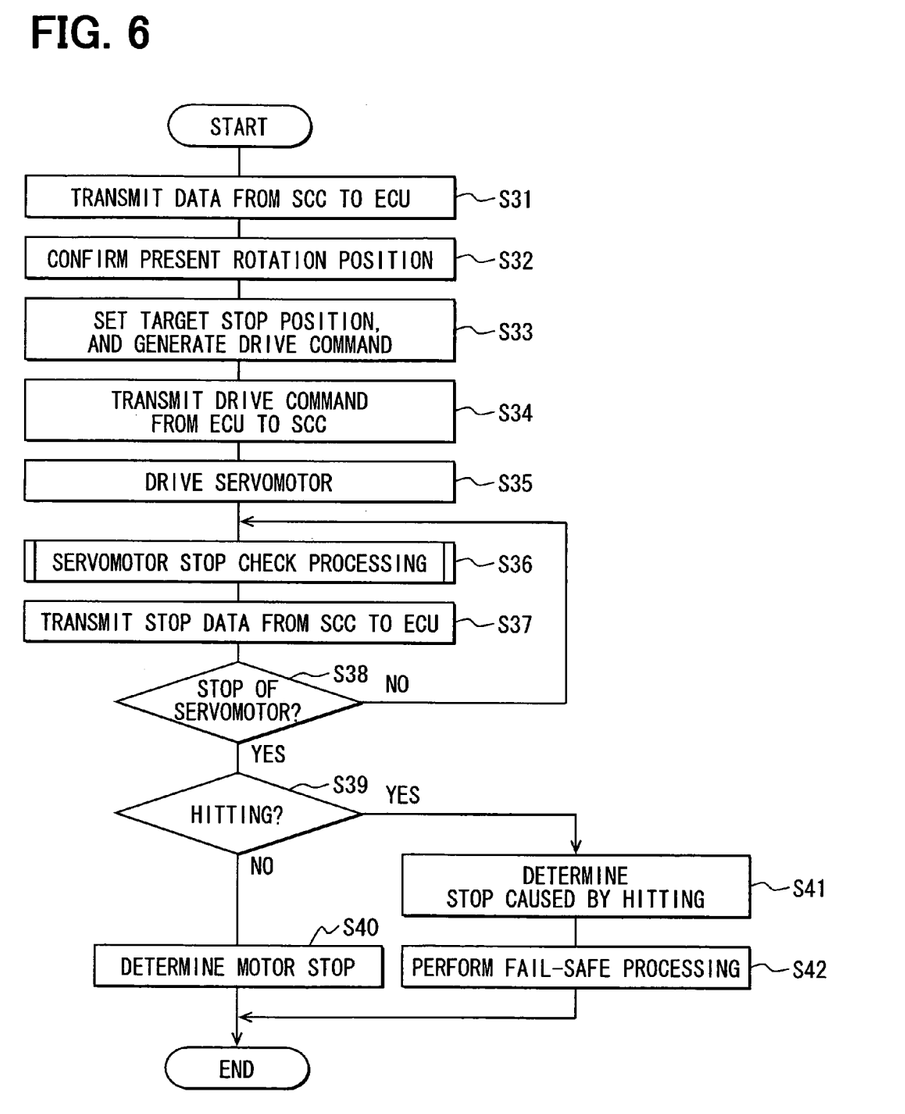
FIG. 6 is a flowchart showing servomotor drive control processing performed in an air conditioner apparatus in the present invention.

According to the embodiment, however, the servomotor drive control processing is executed as shown in FIG. 6.

Steps S31 to S35 are the same as steps S11 to S15 described with reference to FIG. 5. The logic circuit 191 executes motor stop check processing (S36) after driving the servomotor 19. The servomotor control circuit 190 (specifically logic circuit 191) and the A/C ECU 50 continue to perform the regular communications (S37), while the servomotor 19 is in rotation (S38: NO).

When the data received from the servomotor control circuit 190 includes the stop data indicating the stop of the servomotor 19 (S38: YES), the A/C ECU 50 analyzes the received data for a motor stop root cause and checks whether the hitting is detected (S39). If no hitting is detected (S39: NO), the A/C ECU 50 determines that the servomotor 19 has attained and stopped at the target stop position (S40).

If the hitting is detected (S39: YES), the A/C ECU 50 determines that the motor stop is caused by the wall-hitting (S41) and performs fail-safe processing (S42) similar to step S26 described with reference to FIG. 5.

Figure 7:
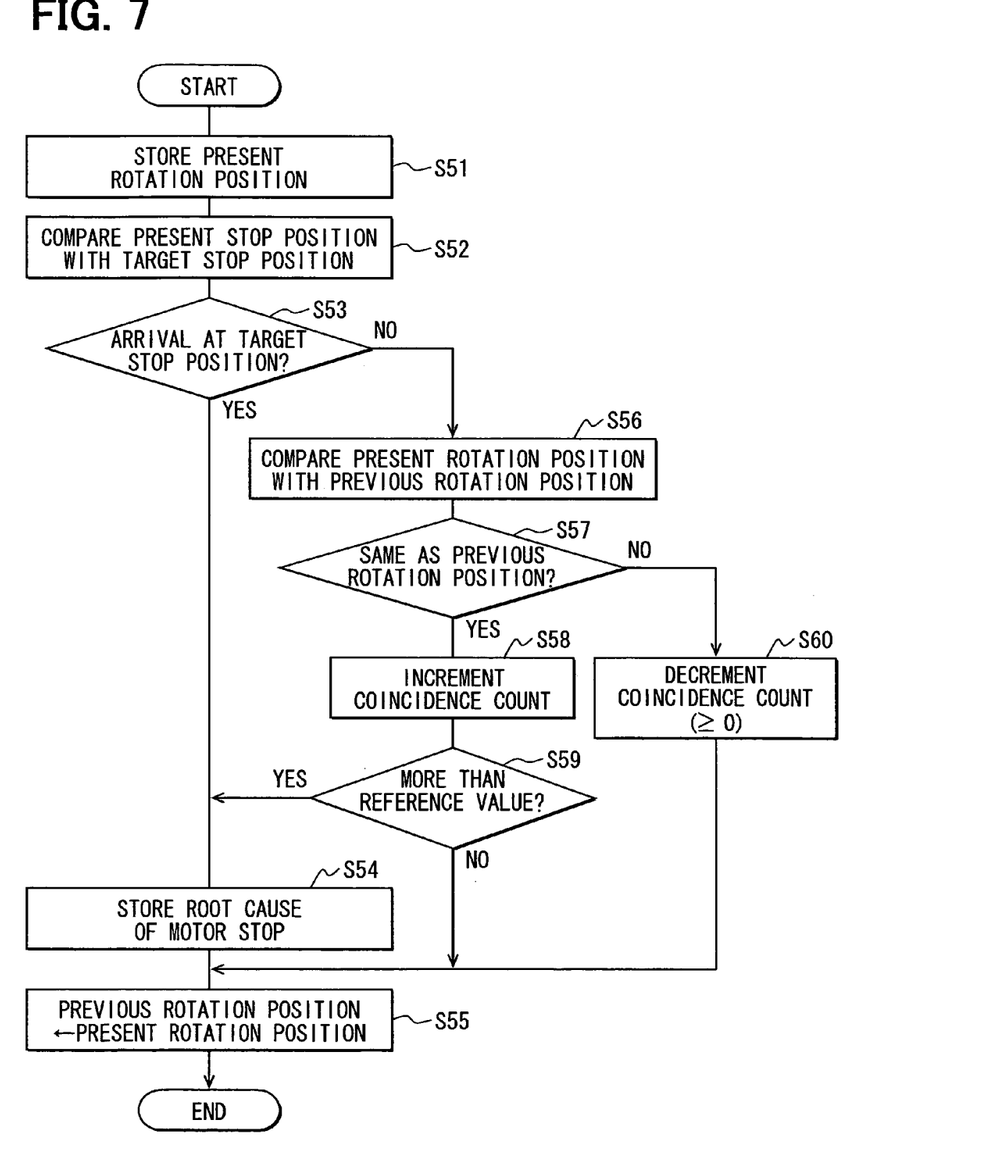
FIG. 7 is a flowchart showing servomotor stop check processing.

The servomotor stop check processing corresponding to step S36 shown in FIG. 6 is described in detail with reference to FIGS. 7 and 8. This processing is executed at a predetermined time interval T shown in FIG. 8, which is different from and not related to a rotation speed of the servomotor 19, that is, time period of the pulse signals P1 and P2 produced by the pulse encoder 195.

First, the logic circuit 191 acquires the count value of the present position counter (FIG. 4) and stores it in a present rotation position register of the memory 191m or RAM (not shown) as the present rotation position (S51). The logic circuit 191 compares the present rotation position with the target stop position of the servomotor 19 (S52), which is received from the A/C ECU 50 and stored in the memory 191m or RAM.

If the present rotation position of the servomotor 19 coincides the target stop position, that is, when the servomotor 19 arrives at the target stop position (S53: YES), the logic circuit 191 transmits a command to the motor driver 192 for stopping the servomotor 19. The logic circuit 191 determines that the root cause of the stop is determined to be the arrival at the target stop position, and stores this determination along with the state (stop) of the servomotor 19 in the memory 191m or RAM as transmission data to the A/C ECU 50 (S54). Then, the logic circuit 191 replaces the content of the previous rotation position register stored in the memory 191m with the content of the present rotation position register (S55) thus updating the previous rotation position and ending the processing.

If the present rotation position of the servomotor 19 does not coincide with the target stop position, that is, the servomotor 19 has not yet arrived at the target stop position (S53: NO), the logic circuit 191 compares the content of the present rotation position register indicating the present rotation position with the content of the previous rotation position register (S56).

When the present rotation position of the servomotor 19 coincides with the previous rotation position (S57: YES), the logic circuit 191 increments the count value (number of coincidence) of the coincidence count register stored in the memory 191m by one (S58).

If the count value of the coincidence count register is more than a predetermined reference value (S59: YES), for example equal to or more than 3 as shown in FIG. 8, the logic circuit 191 determines that the air mixing damper 3 is driven beyond the operation limit of the servomotor 19 and hitting the inside wall of the duct 1. The logic circuit 191 transmits the command to the motor driver 192 to stop the servomotor 19. The logic circuit 191 determines that the root cause of the stop is wall-hitting and stores it along with the state (stop) of the servomotor 19 in the memory 191m or RAM as the transmission data to the A/C ECU 50. The logic circuit 191 replaces the value of the present rotation position register with the value of the present rotation position register stored in the memory 191m (S55), thus ending the processing of S36.

If the count value of the coincidence count register is less than the predetermined reference value (S59: NO), the logic circuit 191 replaces the content of the previous rotation position register with the content of the present rotation position register (S55), thus ending the processing of S36.

If the present rotation position of the servomotor 19 does not coincide with the previous rotation position (S57: NO), the logic circuit 191 decrements the count value of the coincidence count register stored in the memory 191m (S60). The lower limit of the coincidence count register is set to zero. The logic circuit 190 replaces the content of the previous rotation position register with the present rotation position register in the memory 191m (S55), thus ending the processing of S36.

Figure 8:
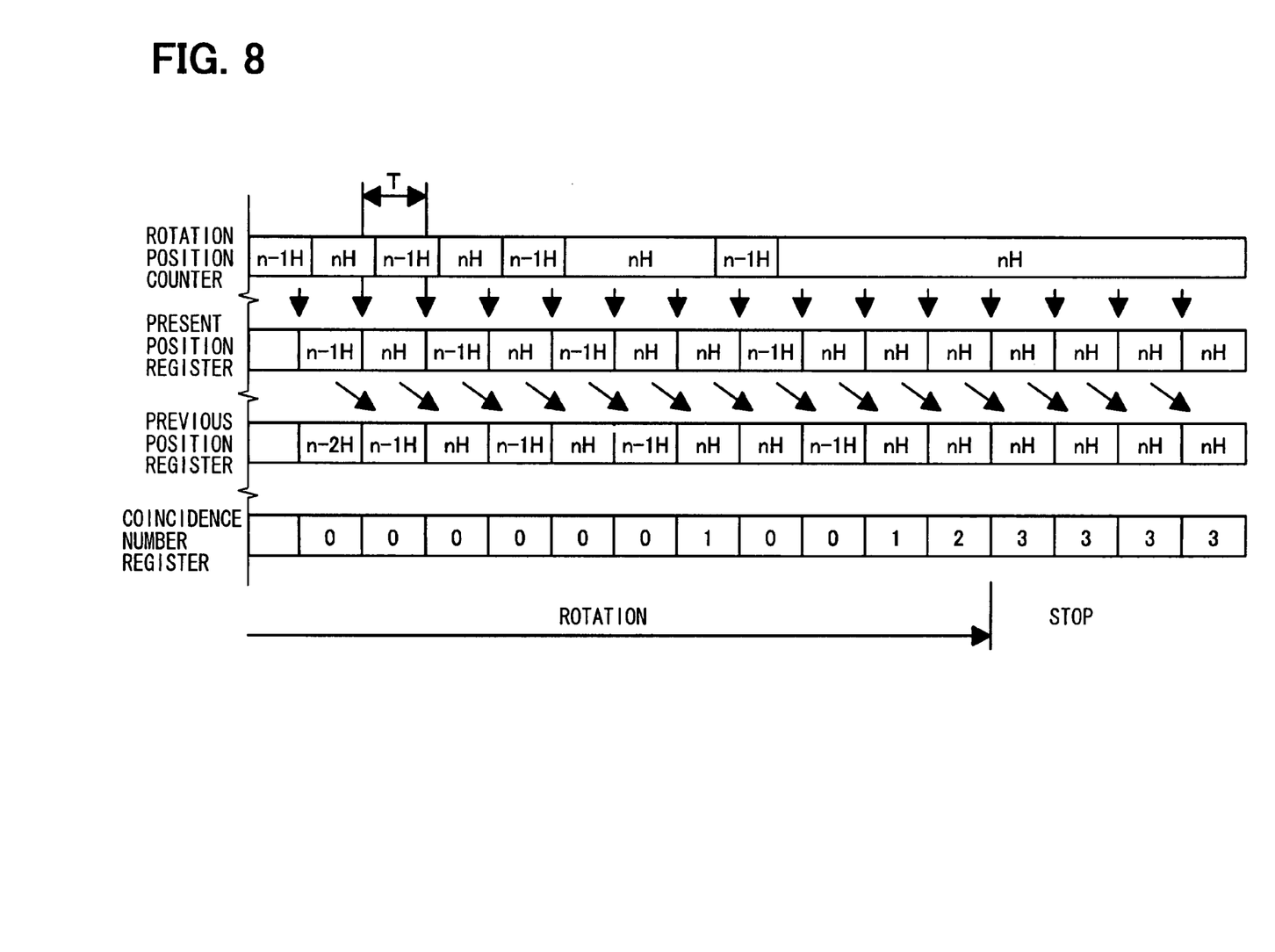
FIG. 8 is a time chart showing servomotor stop operation.

When the wall-hitting is detected, the motor is stopped according to a sequence shown in FIG. 8. As described above, the value of the rotation position counter is stored into the present rotation position register at the predetermined interval and compared with the value stored in the previous rotation position register. If the values of the two registers are equal and different, the value of the coincidence count register is incremented and decremented by one, respectively. The decrement is limited to 0 (lowest value). When the value of the present position counter continues to be nH (H: hexadecimal number), that is, when the values of the two registers continue to be equal, and the count value of the coincidence count register reaches the reference value 3, the servomotor 19 is stopped.

The present invention is not limited to the embodiment but may be implemented in a variety of modified embodiments.

What is claimed is:

1. A servomotor control circuit for a system including a servomotor for driving a control object, a main control apparatus for producing a servomotor drive command including a target stop position of the servomotor, and a rotation position detection section provided at an output shaft of the servomotor for detecting a rotation position of the servomotor, the servomotor control circuit comprising:
   a receiver section for receiving the servomotor drive command from the main control apparatus;
   a drive control section for controlling drive of the servomotor so that the rotation position of the servomotor attains the target stop position;
   a rotation position change detection section for detecting a change in the rotation position of the servomotor; and
   an operation limit check section for checking, based on the change in the rotation position of the servomotor, whether the servomotor has attained the operation limit position, wherein
   the drive control section stops drive of the servomotor without reception of a servomotor drive stop command produced from the main control apparatus, when the servomotor is determined as having attained the operation limit position;
   the operation limit check section determines that the servomotor has attained the operation limit position, when the rotation position is different from the target stop position and the rotation position remains the same for a predetermined period;
   the rotation position change detection section includes a sampling section, a position comparison section and a coincidence count storing section;
   the sampling section samples the rotation position detected by counting pulse signals generated in correspondence to the rotation position of the servomotor by the rotation position detection section, the sampling section sampling the rotation position at a predetermined detection timing, which is different from a detection timing of the rotation position;
   the position comparison section compares a previous rotation position sampled previously with a present rotation position sample presently to check whether both rotation positions coincide each other;
   the coincidence count storing section stores a comparison result of the position comparison section as a coincidence count indicative of the number of coincidence of the rotation positions, the coincidence count storing section incrementinq and decrementinq by one the coincidence count when the previous rotation position and the present rotation position coincide each other and differ each other, respectively; and the operation limit check section determines that the servomotor has attained the operation limit position when the coincidence count exceeds a predetermined value.

2. The servomotor control circuit according to claim 1, wherein:
the coincidence count storing section stores zero as a lowest limit value of a decrement result in case of decrementing one from the coincidence count.

3. The servomotor control circuit according to claim 1, further comprising:
a transmitter section for transmitting a state of the servomotor to the main control apparatus, when the servomotor is determined as having attained the operation limit position and the drive control section has stopped driving the servomotor.

4. The servomotor control circuit according to claim 1, wherein:
the receiver section, the drive control section, the rotation position change detection section and the operation limit check section are provided for each of a plurality of servomotors.

5. The servomotor control circuit according to claim 1, wherein:
the receiver section, the drive control section, the rotation position change detection section and the operation limit check section are provided for controlling the servomotor in an air conditioner apparatus of a vehicle, in which the servomotor is for rotating a movable door provided in an air passage of an air conditioner unit included in the air conditioner apparatus.

* * * * *